United States Patent Office 3,151,126
Patented Sept. 29, 1964

3,151,126
4-METHYL-6-[2-FORMYL-PROPENE - 1 - YL]-
PYRONE-(2) AND A PROCESS FOR ITS
MANUFACTURE
Gerhard Lohaus, Kelkheim, Taunus, Germany, assignor to Farbwerke Hoechst Aktiengesellschaft vormals Meister Lucius & Brüning, Frankfurt am Main, Germany, a corporation of Germany
No Drawing. Filed Mar. 12, 1963, Ser. No. 264,721
Claims priority, application Germany, Mar. 17, 1962,
F 36,305
6 Claims. (Cl. 260—343.5)

The present invention relates to 4-methyl-6-[2-formyl-propene-1-yl]-pyrone-(2) and to a process for its manufacture from 4-methyl-6-(2-methyl-propene-1-yl)-pyrone-(2) by oxidation by means of selenium dioxide.

It has been found that 4-methyl-6-[2-formyl-propene-1-yl]-pyrone-(2) of the formula

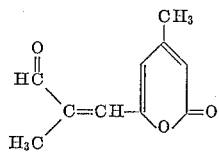

can be obtained in a good yield by causing selenium dioxide to act on 4-methyl-6-[2-methyl-propene-1-yl]-pyrone-(2).

The constitution of the products of the invention results from the ozonolysis. In this case methylglyoxal is found in addition to glycollic acid, but no acetone can be detected. If the oxidation had taken place at the methyl group in the 4-position of the pyrone ring, acetone should have had formed as a product of the splitting by ozone.

The 4 - methyl-6-(2-methyl-propene-1-yl)-pyrone-(2) used as starting product in the process of the present invention can be prepared, for example, by causing polyphosphoric acid to act on β,β-dimethyl-acrylic acid.

The process of the present invention can be carried out in the absence of solvents; it is, however, preferable to perform the oxidation in a solvent which is stable to selenium dioxide. As such solvents there may be mentioned, for example, hydrocarbons, such as ligroine, benzene, toluene; chlorinated hydrocarbons, for example chlorobenzene; ether such as di-n-butyl ether; anisol and tetrahydrofurane; alcohols, for example, ethanol, propanol, ethylene glycol and low molecular fatty acids, such as acetic acid, propionic acid and butyric acid. There may preferably be used such solvents as possess a high dissolving power for selenium dioxide; as examples there may be mentioned dioxane, pyridine, glacial acetic acid, glycolmonomethyl ether, dimethyl formamide and dimethyl sulfoxide. The solvents need not be used in anhydrous form, it is rather advantageous to carry out the reaction in the presence or with the addition of water, for example in aqueous dioxane or pyridine.

The oxidation proceeds extremely slowly at room temperature so that it is preferable—with regard to an industrially favorable reaction speed—to operate at elevated temperature between about 50 and 150° C., advantageously between 80 and 120° C.

The reaction mixture is preferably worked up in such a way that the separated selenium is filtered off after the termination of the reaction, the solvent is removed under reduced pressure, the residue is taken up in a solvent immiscible or partially miscible with water, advantageously in methylene chloride, the organic phase is thoroughly washed with water and sodium bicarbonate, and after drying, the solvent is distilled off.

The result of the process of the invention is so far surprising as in view of theoretical reflections it was to be expected that the oxidation should take place at the methyl group in the 4-position of the pyrone ring.

This was the more to be expected from the fact that other reactions, for example the condensation of 4-methyl-6-(2-methyl-propene-1-yl)pyrone-(2) with oxalic acid esters proceeds at the methyl group bound to the ring. Furthermore, the practicability of the process of the present invention is also surprising, since own experiments have shown that, if selenium dioxide is caused to act on 4,6 - dimethyl - pyrone - (2) under the conditions of the process of the present invention, the corresponding 4-formyl compounds or 6-formyl compounds are not obtained, but an oxidative degradation of the pyrone ring takes place.

The aldehyde 4-methyl-6-[2-formyl-propene-1-yl]-pyrone-(2) obtainable by the process of the present invention is a valuable intermediate product for organic syntheses, especially for the manufacture of compounds with higher conjugated unsaturated systems, such as carotinoids and related compounds. On condensing for example, the aldehyde prepared according to the present invention with cyclogeraniol or cyclogeranyl halides according to methods known as such, there is obtained a yellow compound which is related to the vitamin A and which, for instance, can be used as food dye.

The following example serves to illustrate the invention, but it is not intended to limit it thereto:

*Example*

160 grams of selenium dioxide are dissolved in a mixture of 1200 cc. of dioxane and 80 cc. of water while heating. 200 grams of 4-methyl-6-[2-methyl-propene-yl]-pyrone-(2) are then added thereto, and the mixture is heated for 10 hours at 110° C. After filtering off the precipitated selenium, the solvent is distilled off under reduced pressure, the residue is taken up in methylene chloride, and the solution is shaken out with water and an aqueous sodium bicarbonate solution. It is important that the acid is removed completely, since otherwise acetalisation occurs when the reaction mixture is worked up, and thus it becomes difficult to isolate the aldehyde. The organic phase is then dried with sodium sulfate, and the methylene chloride is distilled off. The residue is triturated with 300 cc. of methanol and cooled at −20° C. By filtering with suction and washing with cold methanol 118 grams of 4-methyl-6-[2-formyl-1-propene-1-yl]-pyrone-(2) are isolated, melting point 134–136° C. The product can be recrystallized from methanol/water, if desired with the addition of charcoal. Thus, there are obtained slightly yellow colored crystals melting at 136–137° C. The anil of the aldehyde melts at 115° C., the semicarbazone melts at 243° C. with decomposition.

I claim:
1. 4-methyl-6-[2-formyl-propene-1-yl]-pyrone-(2).
2. A process for preparing 4-methyl-6-[2-formyl-propene-1-yl]-pyrone-(2) which comprises contacting 4-methyl-6-[2-methyl-propene-1-yl]-pyrone-(2) with selenium dioxide.
3. A process for preparing 4-methyl-6-[2-formyl-propene-1-yl]-pyrone-(2) which comprises contacting 4-methyl-6-[2-methyl-propene-1-yl]-pyrone-(2) with selenium dioxide in an inert solvent.
4. A process for preparing 4-methyl-6-[2-formyl-propene-1-yl]-pyrone-(2) which comprises contacting 4- methyl-6-[2-methyl-propene-1-yl]-pyrone-(2) with selenium dioxide in an inert solvent selected from the group consisting of petroleum ether, benzene, toluene, chlorobenzene, di-n-butyl ether, anisol, tetrahydrofurane, ethanol, propanol, butanol, ethylene glycol, dioxane, aqueous dioxane, pyridine, aqueous pyridine, acetic acid, glycolmonomethyl ether, dimethylformamide and dimethylsulfoxide.

5. A process as claimed in claim 2 wherein the oxidation is carried out at a temperature in the range of about 50 to about 150° C.

6. A process as claimed in claim 2 wherein the oxidation is carried out at temperature in the range of about 80 to about 120° C.

No references cited.